United States Patent Office 2,897,186
Patented July 28, 1959

2,897,186
DIAZOAMINO DYE INTERMEDIATES

Julius Miller, Newark, N.J., and Dominic Del Guidice, Astoria, N.Y., assignors to Pharma-Chemical Corp., Bayonne, N.J., a corporation of New Jersey No Drawing. Application February 21, 1956
Serial No. 580,159

19 Claims. (Cl. 260—140)

The present invention is directed to a textile printing composition, more particularly to such compositions which yield azo dyes in the printing operation. This application is a continuation-in-part of copending application Serial No. 264,846, filed January 3, 1952, now abandoned, and entitled "Textile Printing Compositions."

In recent years, there have been introduced compositions yielding azo dyes for textile printing of cellulosic fibers, these dye compositions containing generally diazoamino compounds admixed with naphthoic acid arylid coupling components. While several such compositions are in commercial use, there is a difficuflty in the use thereof in that it has been necessary to age the composition with acid vapor in order to develop the dye on the material being printed. Because of this there was difficulty in handling the material; there were disadvantages in the corrosiveness of the acid and in the disposal of the waste.

A number of attempts have been made to overcome these difficulties and disadvantages and it has been proposed to eliminate the acid aging by preparing the final pigment in a water soluble form. This necessitated the use of other reagents and additional steps in the operation. Such complications were serious and the compositions have been in very limited use, if any. In another proposed method for eliminating the acid aging, certain specific diazotizable amines and certain amino carboxylic acids were used in the preparation of the diazoamino compound. However, the dyes thus formed are limited in the colors which may be obtained and produce inferior shades, as a result of which they have not gone into general use. Still other methods have been proposed but none of them have been particularly successful.

The present invention is intended and adapted to overcome the difficulties and disadvantages inherent in prior methods of the type described, it being among the objects of the present invention to provide insoluble azo dyes from water soluble diazoamino compounds which require no acid treatment or which may be formed by extremely short exposure to acid.

It is also among the objects of the present invention to provide an intermediate diazoamino compound which is utilized in the formation of the azo dye.

It is still further among the objects of the present invention to provide a method of printing which embodies a high speed, develops bright colors and the dyes are fast to light and washing.

The invention is directed to a composition involving water-soluble diazoamino compounds and coupling components, which require no acid and which may be set by steam only or which, by an extremely short exposure to acid, generates water-insoluble azo dyes.

The diazoamino compounds are formed by reacting secondary aromatic amines with aromatic diazotized amines. More specifically, these diazoamino compounds are formed by condensing in alkaline aqueous medium a diazonium solution of a diazotised aromatic amine devoid of solubilizing group such as sulfonic or carboxylic acids with a substituted or unsubstituted alkyl or hydroxyl alkyl anthranilic acid or orthanilic acid. They have the following structural formula:

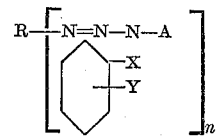

wherein R is the residue of a diazotized or tetrazotized aromatic mono- or diamine, A is an alkyl or hydroxyalkyl group having 1 to 5 carbon atoms, X is a carboxylic acid or sulfonic acid group, Y is hydrogen, halogen, nitro, alkyl, alkoxy and hydroxyalkyl in the meta or para positions relative to the nitrogen, wherein the alkyl groups have from 1 to 5 carbon atoms, and $n$ is 1 when a monoamine is used and $n$ is 2 when a diamine is used.

We have discovered that the above type diazoamino compounds regenerate the diazonium originally used in its formation merely by subjecting it to elevated temperatures above room temperatures (about 20° C.) in the presence of moisture. Thus in the presence of a coupling component azo dye formation occurs. The dye yield is practically quantitative. No acid vapors are necessary, but they are not detrimental when used. In some cases a very short exposure to acid may be advantageous. When acid vapors are used, the exposure in the ager requires only 10–30 seconds as against 3–5 minutes exposure commonly used in practice.

It was not to be expected that the aromatic secondary amine would condense to form a diazoamino instead of condensing in the para position to an azo dye. This reaction is quite unexpected and the reaction may be represented by the following equation:

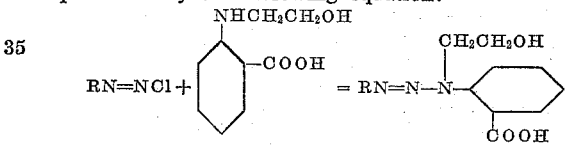

This is directly contrary to what the chemists skilled in the art would expect to be the reaction, as normally the following type of compound would be expected to result:

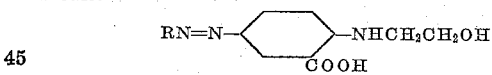

This would be an azo dye.

Furthermore it was not to be expected that such ease of hydrolysis to the diazonium would occur. Moreover it was not to be expected that the diazoamino thus prepared from a diazotised aromatic amine condensed with a substance such as N-hydroxyethyl anthranilic acid to form the diazoamino of this structure—

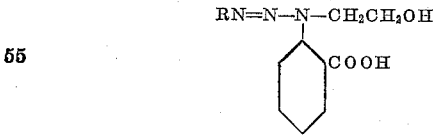

would, when hydrolized by steam in presence of a coupling component, couple to the desired azo dye instead of the dye of the following structure:

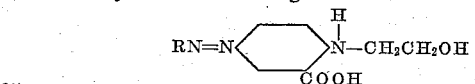

The latter coupling does not occur. The diazonium formed couples smoothly with the coupling component chosen for a desired azo pigment. The same holds true for the corresponding orthanilic compound.

As diazotizable amines or tetrazotized diamines we utilize those aromatic amines or diamines devoid of sulfonic or carboxylic groups usually used to form the well known printing colors, such as the chlortoluidines, chloranisidines, nitrotoluidines, nitroanilines, nitroanisidines, cresidines, dianisidines, benzidines, tolidines, etc. By coupling components are meant the aceto-acetarylides and beta-oxynaphthoic acid arylides and other coupling components such as amino naphthols and derivatives, pyrazolones, etc., devoid of groups lending solubility in water such as sulfonic or carboxylic groups.

The N-alkyl or N-hydroxy alkyl anthranilic or N-alkyl or N-hydroxy alkyl orthanilic compounds are formed by condensing ortho-chlorbenzoic acid or its substituted derivatives or the ortho-chlorbenzol sulfonic acid or its substituted derivatives with the selected hydroxy-alkylamine or alkylamine, in the presence of copper as a catalyst at atmospheric or elevated pressure and at a temperature suitable for the condition of the reaction. These N-alkyl or N-hydroxyalkyl anthranilic or orthanilic compounds are readily isolated as white crystalline compounds. The alkaline earth salts are soluble in water and in excess mineral acid and consume nitrous acid readily to form a nitroso compound typical or aromatic secondary amines. The aqueous solutions of the carboxylic acid metal salts show a bluish fluorescence. The aqueous solution of the orthanilic compound is not fluorescent.

By anthranilic acid we mean aminobenzene orthocarboxylic acid. By orthanilic acid we mean aminobenzene orthosulfonic acid.

The following examples are illustrative of the present invention.

*Example 1*

12.85 parts by weight of the orange colored crystalline diazoamino compound, containing 0.02 pound moles effective, formed by condensing diazotised-4-chlor-2-amino toluene at 2° C., with an alkaline solution of a stoichiometric amount plus 10% excess of 2-carboxy-N-hydroxy ethyl amino benzene and isolated by means of addition of sodium chloride and dried, are mixed with 0.02 pound moles of 2-hydroxynaphthoic acid ortho toluidid. This mixture is dissolved by adding 1.5 lbs. sodium hydroxide solution 26 Bé., 1.25 lbs. Cellosolve (ethylene glycol monoethylether) and 15 lbs. water. When completely dissolved, the solution is thickened with sufficient ammonia neutralized starch-tragacanth paste to total 50 lbs. This paste is now applied to cotton cloth by means of a printing machine with copper rollers effecting a desired design as is the usual practice well known in the art of textile printing. The printed cloth is then dried "on the can" and subsequently exposed to steam vapor at 200-212° F., in a vat ager without pressure. Any suitable apparatus or chamber may be used where the printed cloth is subjected to moisture at an elevated temperature for at least three minutes. The printed material is then soaped in a mild soap bath, rinsed and dried. The cotton is now printed with the chosen design of a vivid full red shade, the probable formula of which is:

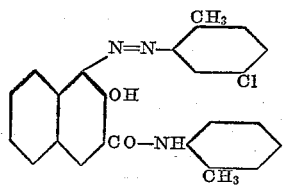

Under these conditions commercial compositions which yield the same dye of the same probable formula yield no colored design since development of these dyes require acid vapors in the ager for at least 3-5 minutes.

*Example 2*

A print paste prepared from 9.67 lbs. of the reddish orange crystalline diazoamino compound representing 0.02 pound moles effective, prepared by condensing in alkaline medium at 5° C. stoichiometric amounts of 4-chlor-2-diazonium chloride methoxy benzene and a 10% excess of N-hydroxyethyl anthranilic acid. The salted out diazoamino at first precipitates as an oil which on standing turns to a crystalline deposit. This is filtered, dried at low temperature.

6 lbs. of beta oxy naphthoic acid ortho anisidide (0.02 pound moles) are added and all is dissolved by adding 1.5 lbs. sodium hydroxide solution 26 Bé., 1.25 lbs. "Cellosolve" and 15 lbs. water. When all in solution, starch-tragacanth paste which has been adjusted to a pH seven is added so that the total weight is 50 lbs. Printing and development is done as described above in Example 1. There results a design in bright bluish rod. This red dye has the probable formula—

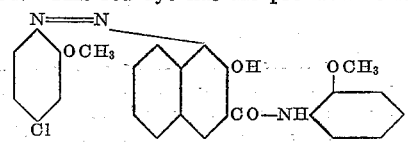

Commercial mixtures which yield this dye of the same probable formula produce no color when subjected to this development without acid vapors.

*Example 3*

A print paste prepared from 0.02 lb. moles 100%, in the form of a wet press cake of the brownish-grey amorphorous diazoamino compound prepared from 4-chlor 2-diazonium chloride-toluene condensed in alkaline medium at 2° C., with a 10% excess of 4-chlor-2-carboxy N-hydroxy ethyl aniline, precipitated as a dense brown oil with sodium chloride and allowed to stand until it is amorphous and filterable.

5.6 lbs. of beta oxynaphthoic acid orthotoluidid.
1.5 lbs. sodium hydroxide solution 26 Bé.
1.5 lbs. "Cellosolve" and sufficient water to total 28 lbs.

This is stirred to solution and then thickened with 22 lbs. of starch tragacanth paste or locust bean paste or sodium carboxy-methylcellulose to a consistency suitable for textile printing and applied to cotton cloth. The printed cloth is developed as described above. The dye is the same color as in Example 1.

*Example 4*

A print paste is prepared from 0.02 lb. moles of the diazoamino obtained by condensing 4-nitro 2 diazonium chloride-anisole and a 10% excess of 4-chlor 2-sulfo N-methyl aniline at 0° C., and isolating by means of salting with sodium chloride, filtering and drying in vaccue at 45° C.

6.25 lbs. naphthol A S B S (Beta-hydroxy naphthoic acid meta-nitroanilide), 1.5 lbs. sodium hydroxide solution 26 Bé and 2.0 lbs. "Cellosolve" (ethyl ether of diethylene glycol) are mixed with sufficient water to make 30 lbs. Total solution is achieved by stirring and then the solution is thickened with 20 lbs. of a suitable colloid for applying the paste to cotton cloth.

After can drying, the printed cloth is passed through a Mather-Platte ager in which a mixture of formic acetic acid vapors are mixed with live steam. The cloth passes through these vapors in twenty seconds. After soaping and rinsing and pressing there results a vivid bluish red, the probable formula of which is—

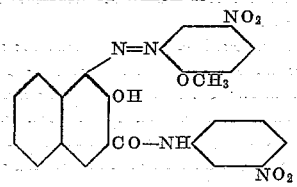

Commercial compositions containing Naphthol A S B S admixed with stabilized diazonium of para-nitro orthoanisidines when subjected to the same treatment show but a stain as compared with the full developments of our mixture. This is due to the short time exposure which results in a very low yield of azo dye formation.

Other examples are as follows:

| Ex. | Diazotized aromatic amine | Stabilizer | Diazoamino | Coupling component | Aging condition | Shade | Probable dye formula |
|---|---|---|---|---|---|---|---|
| 5 | 4-chlor-2-amino toluene | 4-chlor-2-N-hydroxy propyl-amino benzoic acid | | | Live steam | Scarlet | |
| 6 | 2:5 dimethoxy-4-benzoyl-amino aniline | 4-nitro-2-carboxy mono-methylaniline | | | do | Reddish blue | |
| 7 | 4-chlor-2-amino toluene | 3-methyl-6-N-hydroxy ethyl-amino benzoic acid | | | do | Yellow | |
| 8 | 5-nitro-2-amino toluene | 4-methyl-6-N-ethylamino benzoic acid | | | 30 secs. steam and acid vapors | Bordeaux | |

| Ex. | Diazotized aromatic amine | Stabilizer | Diazoamino | Coupling component | Aging condition | Shade | Probable dye formula |
|---|---|---|---|---|---|---|---|
| 9 | o-amino diphenylether | 2-sulfo-4-methoxy-N-hydroxy-ethyl aniline | | | Live steam | Bluish scarlet | |
| 10 | o-amino diphenylether | 2-sulfo-4-methoxy-N-hydroxy-ethyl aniline | | | do | Blue | |
| 11 | Dianisidine | 5-chlor-2-N-hydroxyethyl amino benzoic acid | | | do | Yellowish brown | |
| | P-amino diphenyl methane | 4-ethoxy-2-sulpho-N-ethyl-aniline | | | | | |

| Ex. | Diazotized aromatic amine | Stabilizer | Diazoamino | Coupling component | Aging condition | Shade | Probable dye formula |
|---|---|---|---|---|---|---|---|
| 12 | Beta naphthyl-amine | NH(CH$_2$)$_3$CH$_3$, COOH | (structure) | (structure) | Live steam | Dull red | (structure) |
| 13 | Alpha-amino-anthraquinone | 2-N-normal butyl amino 5-nitro-benzoic acid, NHC$_4$H$_9$, COOH, Cl | (structure) | (structure) | 30 sec. steam and acid vapors | Red | (structure) |
| 14 | 4-diethyl-sulphonamide-2-amino anisole | 2-N-hydroxy-ethyl-amino-5-chlorbenzoic acid, NHC$_2$H$_4$OH, COOH, Cl | (structure) | (structure) | do | Bluish red | (structure) |
| 15 | Ortho amino-azo-toluene | N-iso-amyl-anthranilic acid, NH·CH$_3$, SO$_3$H, CH$_3$(CH$_2$)$_2$CH·CH$_3$ / 4-methyl-amino-3-sulfo sec. amyl benzene | (structure) | (structure) | Live steam | Garnet | (structure) |

| Ex. | Diazotized aromatic amine | Stabilizer | Diazoamino | Coupling component | Aging condition | Shade | Probable dye formula |
|---|---|---|---|---|---|---|---|
| 16 | Benzyl methoxy-2-amino phenyl-sulphone | 5-chlor-2-N iso amyl-amino benzoic acid | | | 30 sec. steam and acid vapors | Scarlet | |
| 17 | 4-chlor-3-amino-benzo trifluoride | 5-chlor-2-N methylamino benzoic acid | | | Live steam | Orange | |
| 18 | Para amino diphenylamine | 2 N-normal butyl amino-5-nitro benzoic acid | | | do | Reddish blue | |
| 19 | 4-cyano 2:5 dimethoxy-aniline | 5-chloro 2 N hydroxy ethyl amino benzoic acid | | | do | Bordeaux | |

The above specific examples are intended to illustrate the wide variety of reactants which may be used in accordance with the invention. Many other coupling components, nitrogen bases and diazonium compounds which are suitable for the present purposes are described in the literature. The book by K. Venkataraman entitled "The Chemistry of Synthetic Dyes," published in 1952 by Academy Press, Inc., vol. 1, describes many such compounds, and on page 660, Table 2, gives a list of amines which is by no means complete. Also, the book by Louis Diserens entitled "The Chemical Technology of Dyeing and Printing," published in 1948 by Reinhold Publishing Corp. gives such a list of amines on page 364, Table 6. The disclosures of both of these books are made a part hereof by reference.

We claim:

1. A dye intermediate having the following structural formula:

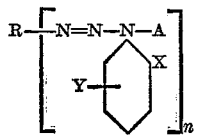

wherein R is a residue taken from the class consisting of diazotized and tetrazotized aromatic mono- and diamines, said amines being free from sulfonic and carboxylic acid groups, A is a radical taken from the class consisting of alkyl and hydroxy-alkyl having 1 to 5 carbon atoms, X is a single radical taken from the class consisting of carboxylic acid and sulfonic acid, Y is a radical in a position taken from the class consisting of meta and para to the nitrogen and taken from the class consisting of hydrogen, halogen, nitro, alkyl, alkoxy and hydroxyalkyl, the alkyl groups having from 1 to 5 carbon atoms, and $n$ is 1 when a monoamine is used and $n$ is 2 when a diamine is used.

2. A dye intermediate according to claim 1 in which the aromatic amine is chlortoluidine.
3. A dye intermediate according to claim 1 in which the aromatic amine is chloranisidine.
4. A dye intermediate according to claim 1 in which the aromatic amine is nitrotoluidine.
5. A dye intermediate according to claim 1 in which the aromatic amine is nitroaniline.
6. A dye intermediate according to claim 1 in which the aromatic amine is nitroanisidine.
7. A dye intermediate according to claim 1 in which the aromatic amine is cresidine.
8. A dye intermediate according to claim 1 in which the aromatic amine is dianisidine.
9. A dye intermediate according to claim 1 in which the aromatic amine is benzidine.
10. A dye intermediate according to claim 1 in which the aromatic amine is tolidine.
11. A dye intermediate having the following structural formula:

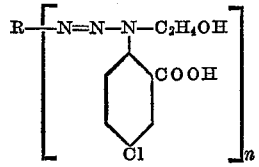

wherein R is a residue taken from the class consisting of diazotized and tetrazotized substituted aromatic mono- and di-amines in which said amines are free from sulfonic and carboxylic acid groups, $n$ is 1 when a monoamine is used and $n$ is 2 when a diamine is used.

12. A dye intermediate having the following structural formula:

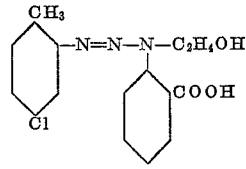

13. A dye intermediate having the following structural formula:

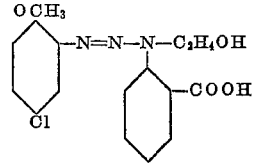

14. A dye intermediate having the following structural formula:

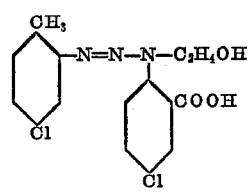

15. A dye intermediate having the following structural formula:

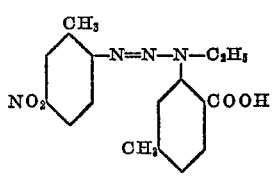

16. A dye intermediate having the following structural formula:

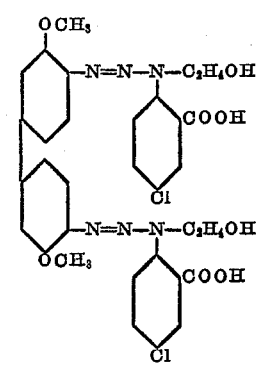

17. A dye intermediate according to claim 1 in which the aromatic nucleus of said amine is the phenyl radical.
18. A dye intermediate according to claim 1 in which the aromatic nucleus of said amine is the naphthyl radical.
19. A dye intermediate according to claim 1 in which the aromatic nucleus of said amine is the anthracenyl radical.

References Cited in the file of this patent
UNITED STATES PATENTS

| | | |
|---|---|---|
| 2,078,387 | Kern | Apr. 27, 1937 |
| 2,124,594 | Schmelzer | July 26, 1938 |
| 2,422,359 | Maynard | June 17, 1947 |
| 2,675,374 | Petitcolas et al. | Apr. 13, 1954 |